US 6,747,738 B2

(12) United States Patent
Knapp

(10) Patent No.: US 6,747,738 B2
(45) Date of Patent: Jun. 8, 2004

(54) OPTICAL SYSTEM WITH VARIABLE DISPERSION

(75) Inventor: David J. Knapp, Tucson, AZ (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/188,160

(22) Filed: Jul. 1, 2002

(65) Prior Publication Data

US 2004/0001201 A1 Jan. 1, 2004

(51) Int. Cl.[7] .............................. G01J 3/06; G01J 3/14; G01J 3/18; G01J 3/28
(52) U.S. Cl. ...................... 356/326; 356/328; 359/615; 359/831; 359/837
(58) Field of Search .............................. 356/300, 326, 356/328; 359/211, 615, 831, 837

(56) References Cited

U.S. PATENT DOCUMENTS

| 4,118,109 | A | * | 10/1978 | Crawford et al. ........... 359/196 |
| 5,479,258 | A | | 12/1995 | Hinnrichs et al. |
| 5,579,177 | A | * | 11/1996 | Stumpf ....................... 359/837 |
| 5,862,001 | A | * | 1/1999 | Sigler ......................... 359/832 |
| 5,986,758 | A | | 11/1999 | Lyons et al. |
| 6,043,882 | A | * | 3/2000 | De Wolf et al. ............. 356/326 |
| 6,075,594 | A | * | 6/2000 | Thomas et al. ............. 356/328 |
| 6,179,246 | B1 | | 1/2001 | Fisel et al. |
| 6,181,853 | B1 | * | 1/2001 | Wade .......................... 385/37 |
| 2002/0175286 | A1 | * | 11/2002 | Murguia ................. 250/339.07 |

OTHER PUBLICATIONS

Kingslake, Rudolf, *Dispersing Prisms*, Applied Optics and Optical Engineering, Academic Press, Inc., New York, New York (1969).

* cited by examiner

*Primary Examiner*—F. L. Evans
(74) *Attorney, Agent, or Firm*—Renner, Otto, Boisselle & Skar, LLP.

(57) ABSTRACT

An optical system (20) provides a variable dispersion that helps to collect multi-spectral information on an object within the field of view. The system (20) includes at least two sets (24, 26) of optical elements (42x 42y, 44x, 44y) that have minimal deviation of a center wavelength and a non-zero deviation of at least one other wavelength. By rotating the sets of optical elements (24, 26) relative to one another or together, the degree of wavelength dispersion and the direction of the wavelength dispersion can be varied, respectively. By selectively rotating the sets of optical elements, the system also can be operated in a non-dispersed "white light" mode with no net dispersion at the image plane.

25 Claims, 4 Drawing Sheets

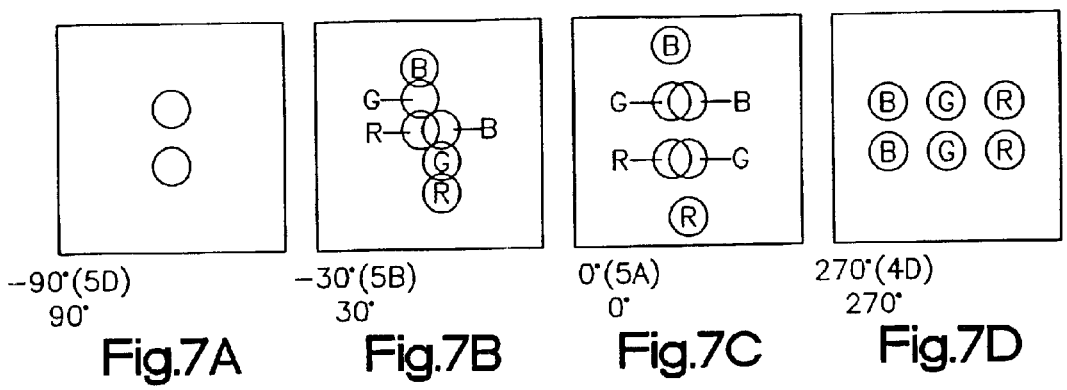
| −90°(5D) | −30°(5B) | 0°(5A) | 270°(4D) |
| 90° | 30° | 0° | 270° |
| Fig.7A | Fig.7B | Fig.7C | Fig.7D |
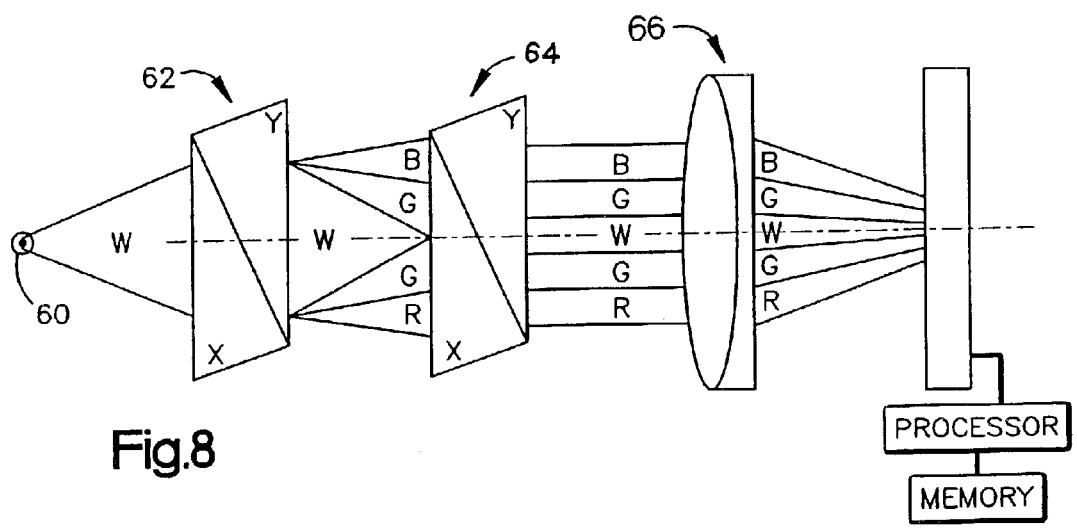
Fig.8
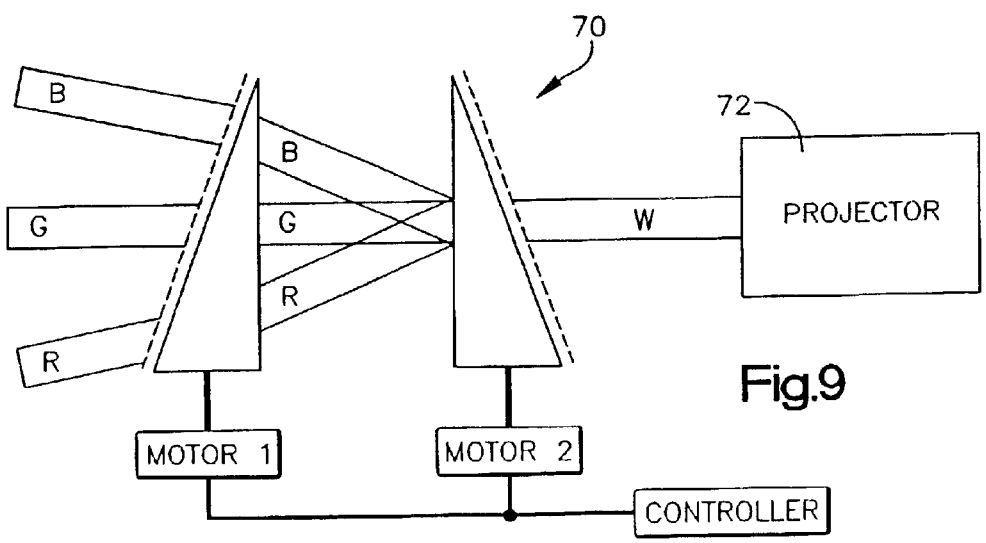
Fig.9

OPTICAL SYSTEM WITH VARIABLE DISPERSION

FIELD OF THE INVENTION

The invention described in the following paragraphs is directed to the field of spectroscopy, and in particular to a spectral disperser that disperses a spectrum of light received from one or more targets within a field of view.

BACKGROUND OF THE INVENTION

The science of spectroscopy and designers of spectrometers provide powerful tools to help the military, environmentalists, foresters, urban planners, farmers, miners, etc., classify features, navigate, track objects, measure productivity and yield, and identify trends and objects in the field. Spectrometers can be used to image a scene across a large number of discrete spectral bands such that a complete reflectance spectrum or signature is obtained. These images often are collected and represented as an image cube with multiple slices, with each slice representing a view of the image at a different wavelength. All objects, geological features, water, vegetation, structures, vehicles, metals, paints, fabrics, etc., create a unique spectral fingerprint that can be used to identify the object using known techniques.

The basic technique includes spreading light out into its constituent wavelengths, focusing the different wavelengths on a sensor positioned at an image plane and analyzing characteristics of the images, including the intensity of each wavelength and the wavelength distribution. These techniques can be used, for example, to automatically identify military targets, to separate an incoming missile's signature from a burning ground signature, to survey crop health, to find camouflaged tanks hidden in the crops, and to identify thermal emissions and hazardous waste, just to name a few uses of this technology.

The multi-spectral information may be gathered using two-color detectors, beam splitters and filter wheels, each of which has its own advantages and disadvantages. For example, two-color detectors have the advantage of instantaneous detection of two different wavebands. Of course, multi-spectral detection with a two color array is limited to two wavebands. In addition, two-color detectors are difficult to design and manufacture, thereby limiting the availability of two-color detectors. Consequently two-color detectors generally are more expensive than panchromatic detectors.

The advantage of using a filter wheel is that only one panchromatic detector is needed. However, a disadvantage of filter wheels is their complexity and cost, and the temporal separation of color channels. Since different color channels must be sampled at separate points in time, collecting data over many wavebands is time consuming and requires a large number of filters on the wheel.

Beam splitters allow instantaneous sampling of information across the bands, but require a detector for each waveband. For cooled infrared detectors, for example, this can dramatically increase the cost, volume, weight, etc., because of the electronics and cooling system that must be hooked up to each detector. This practically limits the number of wavebands that can be sampled. In addition, alignment can be very tricky for the detectors, and packaging limitations can preclude using beam splitters altogether. Beam splitters also are relatively expensive to use for panchromatic sampling.

Some of these devices require changing the distance between an optical element that disperses the light at axially spaced focal planes and a sensor that detects the spectral images. However, it may be difficult to precisely position the axially moveable elements, or to reliably repeat those positions over time, or both. Furthermore, since each wavelength from the continuum of possible wavelengths is in focus at a different axial position along the path of the light, not only is it difficult to capture each wavelength in focus, but the images at different wavelengths have different degrees of magnification. Differences in magnification between images hinders analysis of the images.

These devices require measurements separated in time to obtain a complete spectral signature because at least component must move axially to bring the spectral images at different wavelengths into focus on the sensor. Systems with axially movable elements generally also are less robust and are more sensitive to vibration. Yet another problem with prior devices is that capturing a series of images at different wavelengths over time makes it difficult to obtain a complete image cube if the objects in the field of view are moving.

To avoid some of these problems, diffractive optics have been designed that can sample all of the spectral information at once on a monochromatic imaging array. Light is diffracted into various orders onto the imaging plane and tomography techniques are used to extract the spectral signatures for each imaging point. This type of system has had the disadvantage of lower resolution compared to a monochromatic system of a fixed color separation.

SUMMARY OF THE INVENTION

The present invention provides an optical system with a variable dispersion that allows multi-spectral information to be collected from the field of view without having to resort to a two-color detector, beam splitter, or a filter wheel. In a multi-spectral mode, each of the images in different wavelengths are displaced from an image in a central wavelength, and are in focus at a common magnification on a common image plane. Since the amount of wavelength separation is variable and user controlled, the system also can be operated in a non-dispersed "white light" mode when multiple wavelengths will be in focus at the same place on the image plane at the same magnification. With proper algorithms, the target signature can be extracted from one or more images for comparison to the signatures of known objects. The variable dispersion provided by the present invention not only allows for selective variation in the amount of dispersion of the incident wavelengths, it also allows for selective variation in the orientation of the dispersion across the image plane. In other words, the "smear" of wavelength separation can be made to rotate to a different orientation.

More specifically, the present invention provides an optical system capable of variably dispersing incident electromagnetic energy. The system includes at least two optical elements spaced apart a fixed distance along an optical path. Rotation of one or more of the optical elements relative to one or more of the other optical elements changes the degree of dispersion, and rotation of all of the optical elements together in a common direction changes the orientation of the dispersion.

In accordance with one embodiment of the invention, the system functions as a variable disperser and the optical elements are selected to have approximately zero-degree deviation of a central wavelength and nonzero-degree deviation of at least one other wavelength. The optical elements are grouped into sets, a first set of optical elements and a second set of optical elements. Each set has at least two optical elements that maintain a constant orientation relative to each other. Each set of optical elements includes at least two prisms secured together and aligned so that the central wavelength of electromagnetic energy incident on the set of optical elements generally passes through both prisms.

More particularly, the first set of optical elements includes a first prism formed of a first material and having a first apex angle, and a second prism formed of a second material and having a second apex angle. The second prism has an inverted orientation relative to the first prism. The second set of optical elements includes a third prism formed of a third material and having a third apex angle, and a fourth prism formed of a fourth material and having a fourth apex angle. The third prism has an inverted orientation relative to the fourth prism. Each prism is selected so that a desired central wavelength has approximately zero deviation upon passing through the respective set of optical elements. The first prism is the same as the third prism, and the second prism is the same as the fourth prism.

A motor may be connected to at least two sets of optical elements, each set having at least two optical elements, each set of optical elements being rotatable independently of the other set. The motor includes a first motor connected to a first set of optical elements and a second motor connected to a second set of optical elements.

In accordance with another embodiment of the invention, the system functions as a multispectral scanning system and the optical elements are selected to have nonzero-degree deviation of a central wavelength and zero dispersion. A motor may be connected to each optical element to rotate each optical element independently. In particular, the present invention provides a system that includes four optical elements, each optical element being independently rotatable. Selectively rotating the optical elements can change the look-angle of the system.

In addition, the optical elements may include one or more of a diffractive device (e.g., at least one diffraction grating), a refractive device (e.g., at least one prism) or both. The system may further include an imaging assembly (such as a lens doublet) at a fixed distance from the optical elements that receives dispersed electromagnetic energy from the optical elements and focuses the electromagnetic energy toward an image plane. In addition, the system may include a detector at the image plane that is a fixed distance from the optical elements to receive at least a portion of the electromagnetic energy from the imaging assembly and to convert the incident electromagnetic energy into electronic data. The detector may include at least one photodetector pixel or an array of photodetector pixels.

The system may further include at least one of a processor for analyzing the electronic data from the detector and a memory for storing the electronic data. The processor analyzes the electronic data to identify spectral signatures of objects within the system's field of view. The memory includes a library of electronic data representative of spectral signatures of known objects to facilitate identification of objects in a field of view. The system also may include a controller that selectively and independently controls each motor. The system provided by the present invention has many uses, including such diverse applications as in a missile or a projector, for example.

The foregoing and other features of the invention are hereinafter fully described and particularly pointed out in the claims, the following description and annexed drawings setting forth in detail a certain illustrative embodiment of the invention, this embodiment being indicative, however, of but one of the various ways in which the principles of the invention may be employed.

BRIEF DESCRIPTION OF THE DRAWINGS

FIGS. 7a–7d illustrate the operation of the optical system as the optical elements rotate and image two point sources on the image plane.

FIG. 8 is another embodiment of a variable disperser optical system provided by the present invention with a point source at a finite location.

FIG. 9 is another embodiment of a variable disperser system of the present invention.

DETAILED DESCRIPTION

Figure 1:
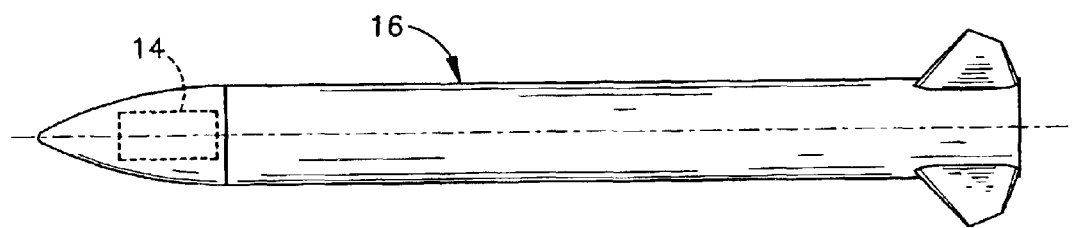
FIG. 1 is a schematic illustration of an optical system provided by the present invention incorporated into a missile.

The present invention provides an optical system capable of selectively dispersing incident electromagnetic energy into one or more spectral images and/or selectively deviating the pattern of dispersed images. The system thus facilitates obtaining spectral signatures from electromagnetic energy received from objects in a field of view. The optical system 14 may be incorporated in a missile 16, for example, as shown in FIG. 1, to help the missile navigate, and identify and track a target of interest, while avoiding many countermeasures.

To facilitate the description and illustration, unless stated otherwise the incident electromagnetic energy is shown and referred to as white light from a source at an infinite location. However, the components of the optical systems provided by the invention can be selected to disperse incident electromagnetic energy from beyond the wavelengths of visible light, including but not limited to wavelengths of infrared, ultraviolet and x-ray energy, for example. In particular, the illustrated systems are shown dispersing incident white light into three distinct wavelengths of blue, green and red, representing a relatively short wavelength, a central wavelength and a relatively long wavelength, respectively, with the deviation of the longer and shorter wavelengths generally exaggerated. As is well known, however, most sources of electromagnetic energy include a spectrum of wavelengths of varying intensities rather than discrete wavelengths that can be separated clearly and completely. In other words, the systems can produce a "smear" of wavelengths of varying intensities dispersed over an angular range.

Figure 2:
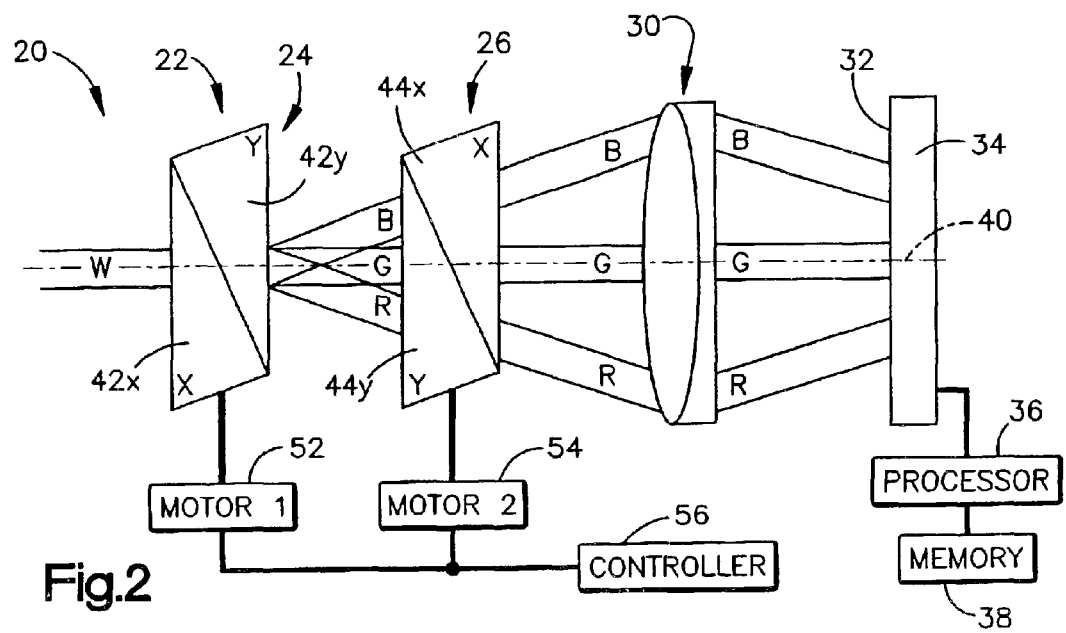
FIG. 2 is a schematic illustration of a variable disperser embodiment of the optical system provided by the present invention with a pair of optical elements arranged to produce maximum dispersion of incident electromagnetic energy.
Figure 3:
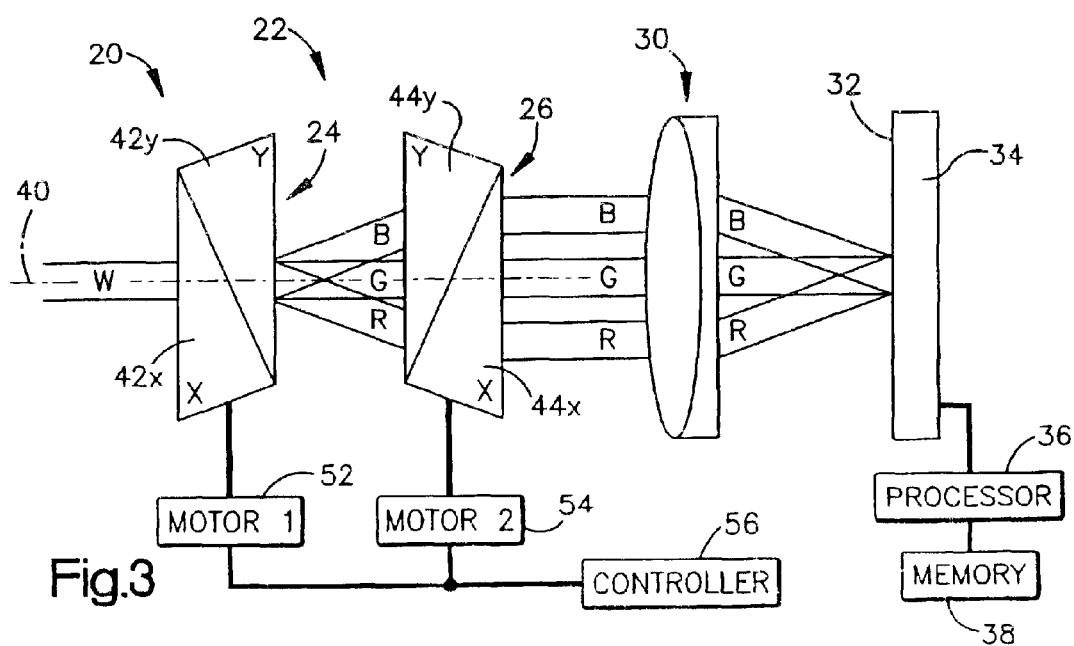
FIG. 3 is a schematic illustration of the optical system shown in FIG. 2 with the optical elements arranged to provide zero dispersion of the incident electromagnetic energy.

One of the optical systems provided by the present invention is a variable disperser system 20, an exemplary embodiment of which is shown in FIGS. 2 and 3. The variable disperser system 20 receives incident light from the field of view that is composed of one or more spectral images, each image representing a single wavelength of the panchromatic image of the field of view. The disperser 22 disperses the spectral images in a direction transverse to an optical path traversed by a central wavelength of the light. The variable disperser system 20 can vary not only the amount of dispersion, but also the orientation of the dispersion. However, the variable disperser system 20 is limited to a constant look angle with respect to the field of regard.

The "field of regard" is the total angular coverage of a gimbal pointing system, e.g., what is "seen" by the system at all possible angles in which the system can be pointed. The "field of view" is the region that is "seen" by the system at any particular instant. The "look angle" is the specific angle from a reference that the system is pointing at in the field of regard. A gimbaled sensor has a constant size field of view, but a gimbal device can change the angle within the field of regard (the look angle). Therefore, in order to change the look angle of the field of view in the variable disperser system another optical component (such as a roll-nod gimballing system) must be provided to scan the field of regard. The scanning optical component either redirects the images to the variable disperser or reorients the variable disperser itself.

The illustrated variable disperser system 20 includes a disperser 22 having two optical devices formed by sets of paired optical elements 24, 26. Each set 24, 26 is independently selectively rotatable to vary at least one of the amount and the direction of dispersion of the incident wavelengths, while passing a central wavelength undeviated and substantially without dispersion. The system 20 also may include one or more of an imaging assembly 30 that directs the images from the disperser 22 to an image plane 32, a detector or sensor assembly 34 at the image plane to detect the one or more spectral images incident thereon and a processor 36 for analyzing the spectral images received by the detector. The detector 34 is positioned at the image plane 32 to receive at least a portion of the dispersed spectral images of interest, either directly from the disperser 22 or indirectly through the imaging assembly 30. An exemplary detector includes a photosensor such as a charged coupled device (CCD). The detector 34 converts the spectral images incident thereon into electronic signals for analysis by the processor 36 or for storage in a memory 38.

Along with the aforementioned disperser 22, the additional optical components are aligned along an optical path traversed by a central nondispersed wavelength. In the illustrated embodiment the optical path is coextensive with a linear axis 40 about which the optical elements are rotatable. Although the disperser 22, the imaging assembly 30 and the detector 34 are arranged along the linear axis 40 in the illustrated embodiment, the optical path may be nonlinear. For example, the system 20 may include one or more reflective elements (not shown) that fold the path of the light passing therethrough to accommodate a limitation on the shape or volume of the available space. The distance along the linear axis between the components in the optical system 20 generally is constant; thus the system is relatively insensitive to vibration and the same magnification is imparted to each wavelength.

As mentioned above, the illustrated variable disperser 22 includes two optical devices or sets of paired optical elements 24, 26. Each optical device includes one or more optical elements. In particular, the disperser includes a first optical device or set of optical elements 24, illustrated as a compound prism, disperses an incident multi-spectral image into a plurality of spectral images, and a second optical device or set of optical elements 26, also illustrated as compound prisms. The second optical device 26 acts on the dispersed images from the first optical device to further disperse the spectral the images or increase the angular deviation of the noncentral wavelengths, to reduce the angular deviation of the noncentral wavelengths or to cancel out the dispersion of the first set of optical elements 24. By selectively rotating the first optical device 24 and the second optical device 26 about an axis generally parallel to the optical path through the disperser 22, the variable disperser 22 can be used to control the amount and direction of the deviation of the noncentral wavelengths without affecting the central wavelength.

Each set of optical elements 24, 26 effects the total dispersion when the images exiting the disperser 22 are dispersed (dispersed mode). In other words, in a dispersed configuration the light leaves the first compound prism with the noncentral-wavelength spectral images deviated at an initial angle, and the deviated noncentral-wavelength images leaving the second compound prism at a full angle of deviation, generally greater or less than the angle the deviated noncentral-wavelength images leave the first compound prism.

As shown in FIGS. 2 and 3, the imaging assembly 30, illustrated as a compound lens, receives the spectral images from the disperser 22 and focuses the images toward a point found by tracing an axis parallel to the direction in which the spectral image is incident on the imaging assembly through the center of the entrance pupil of the lens. Thus, in dispersed mode (FIG. 2) the dispersed bundles of light will additionally have a non-zero angle with respect to the z-axis, a perpendicular to the image plane. In undispersed mode (FIG. 3), the variable disperser 22 laterally displaces the colors of light from each other along generally collimated paths, and the imaging system 30 focuses the dispersed spectral images toward a common spot.

To simplify the design of the variable disperser 22, the deviation of a central wavelength can be set to be equal in both optical elements to provide first and second sets of optical elements 24, 26 that pass a desired central wavelength with minimal or no dispersion. In the illustrated variable disperser 22, each set of optical elements 24, 26 includes a pair of prisms 42x, 42y, 44x, 44y fixedly mounted together to function as a single optical device, specifically a compound prism or a chromatized wedge. In particular, in the illustrated embodiment the optical elements 42x, 42y, 44x, 44y are triangular prisms. An exemplary two-prism optical device may include prisms made of silicon and germanium, for example. The relative orientation of each prism in the prism pairs is fixed with respect to the other prism of the pair. In the illustrated prism pairs, one prism is oriented upside down relative to the other prism. Each prism in a prism pair generally is made of a different material and may have a different apex angle. In the illustrated embodiment the optical elements in each prism pair are identical in shape and the prism pairs are arranged with prisms made of like materials facing each other. Other arrangements that provide the desired angular deviation are possible.

The optical elements 42x, 42y, 44x, 44y may include elements capable of dispersing either transmitted light (such as a lens) or reflected light (a reflective surface). The optical elements also may include diffractive elements, such as diffraction gratings or an optical element created from a photonic crystal. Diffraction gratings generally are planar (usually glass) plates with fine lines or rulings etched or scratched onto the surface. Diffraction grating line densities generally are between approximately seven hundred to eighteen thousand lines per centimeter. Other densities are possible depending on the wavelength and the desired angular deviation. The density of the lines is dependent upon the wavelength of the light and the desired angular deviation provided by the diffractive surface. However, although a diffraction grating generally is lighter weight than a refractive lens, diffraction gratings generally produce more stray light which could interfere with the analysis of the image. Photonic crystals allow deviation of light in ways not generally possible using conventional refractive prisms and diffraction gratings. For instance, a photonic crystal prism can be made with a dispersion that is opposite that of a conventional refractive prism or a superprism can be made that deviates all wavelengths of light substantially equally.

Figure 4A:
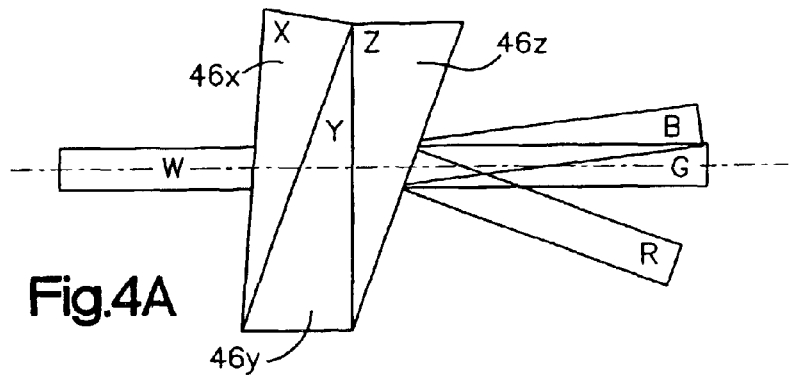
FIGS. 4a and 4b illustrate alternative optical elements.
Figure 4B:
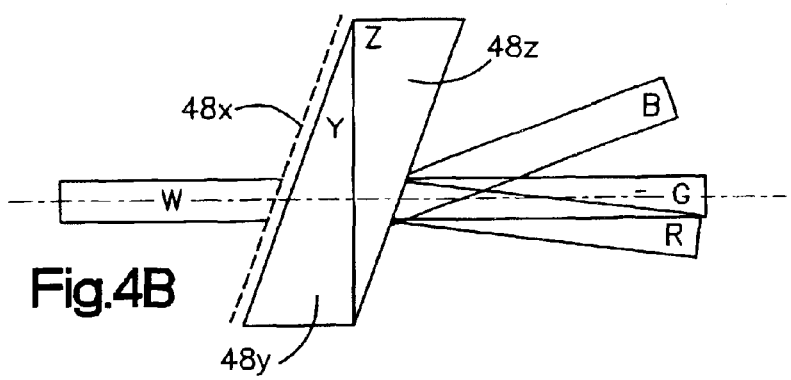
Figures 5A, 5B, 5C, 5D:
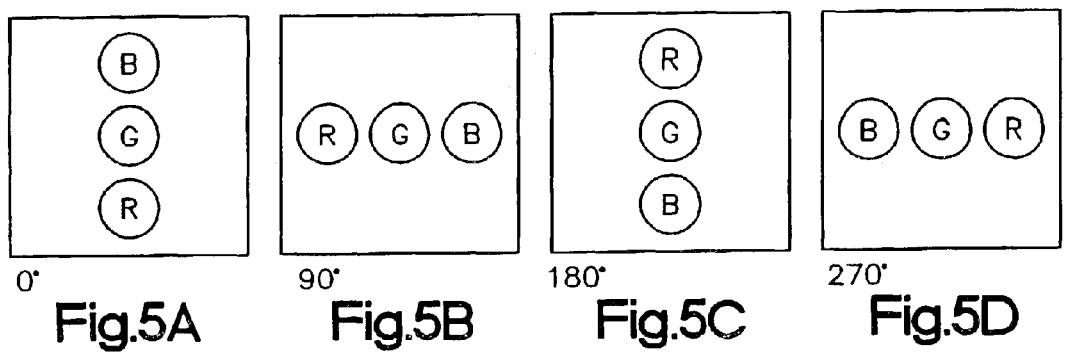
FIGS. 5a–5d are schematic illustrations of three discrete wavelengths of light incident on an image plane at different angular positions of the optical elements as sequentially rotated together.
Figures 6A, 6B, 6C, 6D:
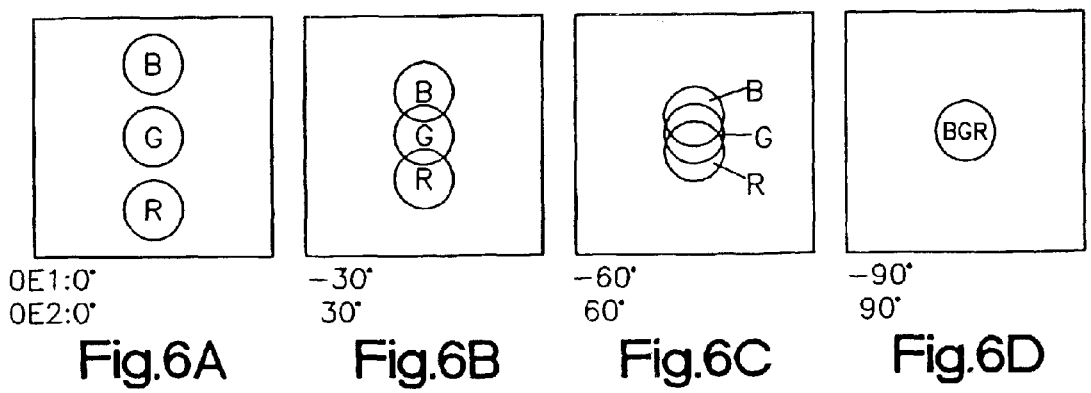
FIGS. 6a–6d are sequential views of the image plane illustrating a range from maximum dispersion to zero dispersion as the optical elements are counter-rotated.

Computer programs and equations for selecting optical parameters (such as apex angles and material choices) are well known in the field, including Code V® from Optical Research Associates of Pasadena, Calif. U.S.A. The angles between the central wavelength and the longer and shorter wavelengths do not have to be equal. In some cases this can be accomplished by using more than two optical devices to form each set of optical elements, as shown in FIGS. 4a and 4b. FIG. 4a shows the dispersion provided by a compound prism composed of three prisms 46x, 46y and 46z. FIG. 4b shows the dispersion provided by an optical device composed of a diffraction grating 48x, and two prisms 48y and 48z. In each instance, the deviation of the longer and shorter wavelengths from the central wavelength is not equal.

The first and second optical devices 24, 26 are rotatable about an axis that generally is not in a plane that is perpendicular to the optical path. In the illustrated embodiment both sets of optical elements 24, 26 are rotatable about an axis that is parallel to and coextensive with a central axis 40 of the system 20.

Rotation of the two optical devices 24, 26 is controlled by respective motors 52, 54 and an associated controller 56. The motors 52, 54 are independently and selectively controlled by the controller 56 to coordinate the relative rotation of each optical device 24, 26. The controller may be integral with or the same as the processor 36. In other words, in addition to processing image data the processor also may function as the controller. The motors may be omitted, however, to allow manual control of the positions of one or more sets of the optical elements (see, e.g., FIG. 8).

Rotation of the second optical device 26 relative to the first optical device 24 changes the amount of dispersion from zero or minimal dispersion to a maximum. In the illustrated embodiment, the central wavelength is undeviated and relatively unaffected by the relative orientation of the optical devices 24, 26, which were selected to provide such an effect. However, the optical devices 24, 26 may be selected for nonzero central wavelength deviation instead. Such a configuration is discussed below in connection with a scanning system formed in accordance with the invention. Rotation of all the optical elements 24, 26 together rotates the direction or orientation of the dispersion pattern. The variable disperser 22 can displace the spectral images formed in the noncentral wavelengths away from the central wavelength, thereby changing the angle of deviation from the path of the central wavelength while maintaining a generally constant magnification of each image.

As shown in FIGS. 5a–5d, rotating the sets of optical elements 24, 26 (FIG. 2) together rotates the direction of the dispersion on the image plane. As shown in FIGS. 6a–6d, however, counter-rotating the sets of optical elements 24, 26 varies the amount or degree of dispersion from a maximum (FIG. 6a) to zero deviation or a non-dispersed image in FIG. 6d. Again, the amount of dispersion shown in these figures has been exaggerated to facilitate the description, and only three discrete wavelengths are shown. A non-dispersed image increases the intensity of the energy incident on the detector, which can facilitate target detection. Dispersed wavelength images, however, also can facilitate target identification. The system 20 may use phase diversity techniques that compare the dispersed and non-dispersed images to analyze the images.

Further advantages can be obtained by also varying the orientation of the dispersion pattern, as shown in FIGS. 7a–7d. Two adjacent point sources (nondispersed image shown in FIG. 7a) may interfere with each other whether the deviation is small, as shown in FIG. 7b, or at a maximum, as shown in FIG. 7c. However, the combination of rotation and dispersion may separate the spectral images of each point source, as shown in FIG. 7d, to facilitate the analysis and identification process. As a result, scenes having many different objects may require manipulation of one or more of the sets of optical elements 24, 26 to provide different combinations of image rotation and dispersion to separate the spectra for analysis.

Returning to FIGS. 2 and 3, from the variable disperser 22 the imaging assembly 30 directs the light to the image plane 32. With the detector 34 at the image plane, the imaging assembly 30 also directs the spectral images onto the detector 34. In the illustrated embodiment, the imaging assembly 30 is represented by a lens doublet that focuses or collimates the incident light received from the disperser 22. The imaging assembly may include one or more reflective or refractive devices, including lenses, mirrors, reflective surfaces or prisms in addition to or as an alternative to the illustrated lens doublet. The imaging assembly may include one or more reflective elements to fold the path of light and to direct the incident spectral images received from the optical elements to the image plane.

A further alternative is shown in FIG. 8 with an object 60 in the field of view relatively close to the optical system 62. In contrast to the illustrated system, the imaging assembly 64 may be omitted so that light that enters the variable disperser 66 is dispersed with respect to wavelength but remains collimated rather than focused by the illustrated imaging assembly 64 as shown.

As yet another alternative, an imaging assembly could be positioned in front of the variable disperser and the system would perform very similarly to the first disperser configuration as far as first order behavior is concerned, although the imaging assembly would introduce additional aberration content into the light.

Referring again to FIGS. 2 and 3, the detector 34 generally includes a plurality of photosensitive pixels, a linear or planer array of such pixels, or other means for detecting at least one wavelength of an image. The image at the image plane 32 generally resolves and covers one or more pixels in the detector. For example, the detector may be positioned to receive the central and longer wavelengths but not the shorter wavelengths. In addition or in the alternative, the incident "smear" of light may include overlapping images at different wavelengths incident on one or more pixels in the detector for conversion into an electronic signal for storage in the memory, analysis by the processor, or both.

In another example, one pixel may have wavelength "a" coming from the bottom of an extended object in the field of view (such as from the base of a tall tree), wavelength "b" coming from the middle of the extended object (such as from the trunk of the tree), and wavelength "c" coming from the top of the extended object (from the leaves at the top of the tree). Similarly, the other pixels will have light from a superposition of object points with different wavelengths. In an undispersed mode, each pixel on the array has multi-wavelength light arriving on it from each individual point on the extended object. The variable disperser increases the flexibility for sampling the extended object over wavelength as well as spatial position along the object.

Since dispersion of the spectral images is based on wavelength, a monochromatic array that detects a single wavelength can be used as the detector at the image plane. In other words, no filters are required to restrict the received images to a particular wavelength. In addition, because each of the spectral images is incident on a common image plane simultaneously, the detector is able to acquire an image cube in a single "snapshot" with each image at the same magnification and clarity. The detector 34 converts the incident images into electronic signals that can be processed by the processor 36 or stored for later analysis.

The memory 38 or other data storage device for storing electronic data, includes at least one of spectral image data and data relate to the spectral signatures of known targets for comparison to the spectral signatures obtained from one or more objects in the field of view. The memory may be separate from the processor, as shown in the illustrated embodiment, or integral with the processor. The memory includes at least one of volatile and non-volatile memory and data storage components. Volatile components are those that do not retain data upon loss of power. Non-volatile components are those that retain data upon a loss of power. Thus, the memory includes at least one of random access memory (RAM), read-only memory (ROM), hard disk drives, floppy disks accessed via an associated floppy disk drive, compact disks accessed via a compact disk drive, digital video disks (DVD) accessed via a digital video disk drive, magnetic tape accessed via an appropriate tape drive, and other memory components or a combination of two or more memory components. In addition, the RAM includes at least one of static random access memory (SRAM), dynamic random access memory (DRAM), magnetic random access memory (MRAM), and other memory devices. The ROM includes at least one of a programmable read-only memory (PROM), and erasable programmable read-only memory (EPROM), and electrically erasable programmable read-only memory (EEPROM), and other memory devices. The processor and the memory in the illustrated embodiment may represent multiple processors and memories linked together by a communication network.

Signal processing devices and software are well known for isolating images at a particular wavelength and for analyzing the resulting image. By measuring the intensity of different wavelengths, the processor can determine the spectral signature of objects in the field of view.

In a missile, the processor may analyze the spectral images to identify and track a target and to avoid obstacles in the path to the target, for example. The processor analyzes electronic signals representing the spectral images received from the detector and determines the spectral signatures of the objects in the field of view. The spectral signature of an object is built up from the wavelengths and relative intensities thereof of multi-spectral images that can be compared to a library of known target signatures stored in the memory. In other words, the processor can compare these signatures to the spectral signatures of known objects to identify the objects in the field of view and to avoid anti-missile countermeasures. In addition, phase diversity algorithms could be used to restore diffraction-limited performance to blurry optical systems.

As shown in FIG. 9, a variable disperser system 70 provided by the present invention also may be used in a theater in connection with a spotlight or a video projector 72 to selectively separate the colors of the incident images, to rotate the orientation of the images, and to recombine the images to allow the combined image to appear to pass unchanged through the system. This illustrates yet another advantage of the variable disperser system provided by the invention: because it can be designed to fit within a compact space it can be part of a kit used to retrofit prior art devices.

The variable disperser system can be placed in collimated space in combination with a device for changing the field of view and for scanning the field of regard, to change the degree of color dispersion from about zero to the maximum value. The variable disperser also may be used to retrofit an existing imaging system and convert it from a panchromatic imager into a panchromatic/multispectral selectable imager.

Figure 10:
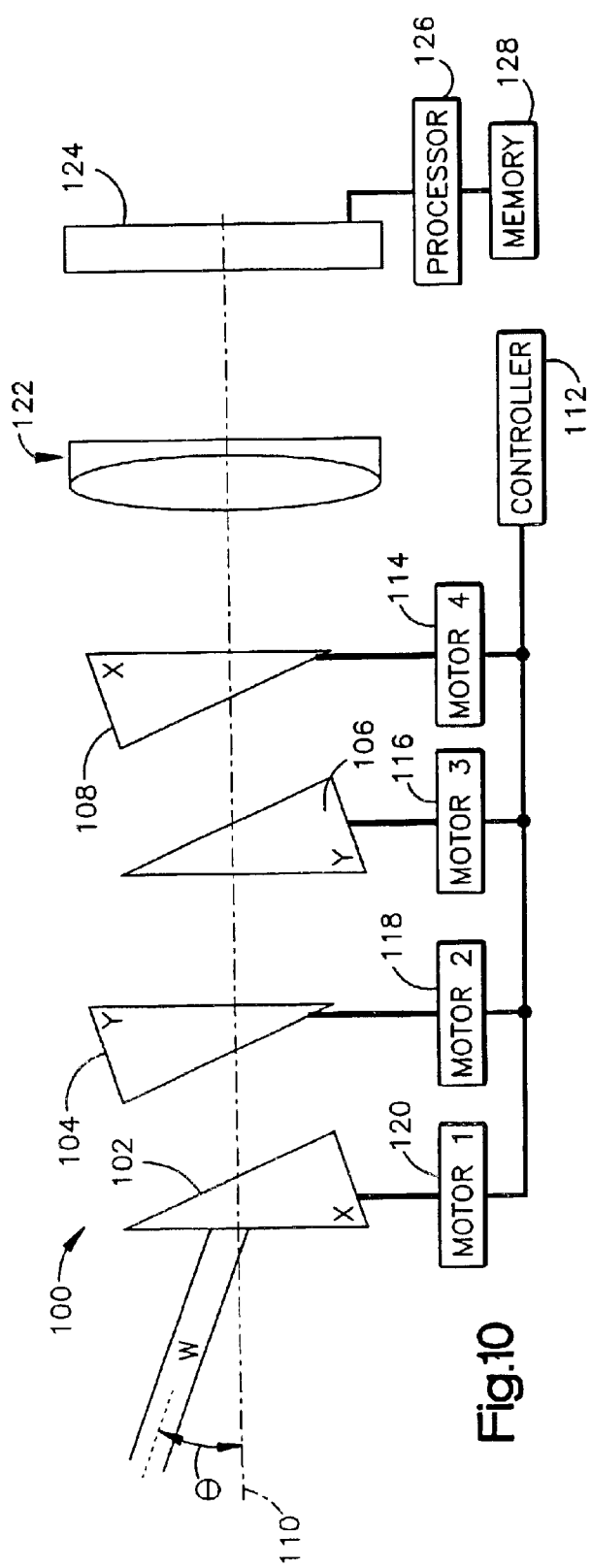
FIG. 10 is a schematic illustration of another embodiment of an optical system provided by the present invention with scanning capability.

The present invention also provides a multi-spectral scanning system that, unlike the variable disperser system, can change both the center wavelength deviation and the look angle. An exemplary embodiment of a multi-spectral scanning system 100 is shown in FIG. 10. The scanning system 100 is similar to the variable disperser system 20 (FIG. 2) described above; however, in the scanning system 100 more than two optical devices 102, 104, 106, 108 are individually rotatable. Specifically, four optical devices, each having one optical element, are individually rotatable in the illustrated embodiment. In the scanning system 100, the optical devices 102, 104, 106, 108 are designed for nonzero-degree central wavelength deviation and zero dispersion. As a result, the scanning system 100 can perform the same functions as the variable disperser system 20 (FIG. 2), with the additional ability to change the look angle $\theta$ to scan the field of regard. Consequently, the scanning system 100 provided by the invention obviates the need of the variable disperser system for another component to scan the field of regard, such as the aforementioned roll-nod gimballing system.

In the illustrated multi-spectral scanning system 100 the optical elements 102, 104, 106, 108 are optically aligned along an optical path coextensive with a central axis 110 of the system. Appropriate optical elements may include one or more prisms, lenses, photonic crystal elements, or diffractive elements, as described above in connection with the variable disperser system. The addition of a diffractive element can linearize the spectral separation.

The illustrated scanning system 100 uses a controller 112 and four separate motors 114, 116, 118, 120 to rotate the respective optical devices 108, 106, 104, 102. More particularly, as shown in the illustrated embodiment, the scanning system includes four independently controllable prisms 102, 104, 106, 108 and a motor associated with each prism. The illustrated system 100 also includes one or more of an imaging assembly 122, a detector or sensor assembly 124 at the image plane, a processor 126 for analyzing the spectral images received by the detector and a memory 128 associated with the processor for storing data. These components are similar to respective components associated with the variable disperser system and no further description is needed.

When the optical elements 102, 104, 106, 108 are oriented for zero deviation of the central wavelength and are rotated in pairs, the scanning system 100 functions as a variable disperser with a constant look angle although with less dispersion than is possible with the optical elements oriented to provide nonzero central wavelength deviation. In addition to the panchromatic sensing capabilities of the variable disperser system, the scanning system also provides functions analogous to the functions of a roll-nod gimballing system for scanning the field of regard. Counter-rotation of at least one of the optical elements provides a "nod" motion, changing the look angle relative to the central axis. Rotating all four wedges in the same direction by the same amount provides a "roll" motion, changing the angular position of the look angle relative to a reference position about the central axis. The ability to change look angles means that the scanning system can replace the combination of the variable disperser and a gimballing system, while further reducing complexity, decreasing axially length, decreasing response time and minimizing axial space taken up by the system, etc.

However, in the scanning system 100 the amount of color separation is dependent on the look angle. The angular deviation increases with increasing look angle and decreases with a decreasing look angle, moving the dispersion pattern radially inward or outward from the origin on the image plane as shown.

Figure 11:
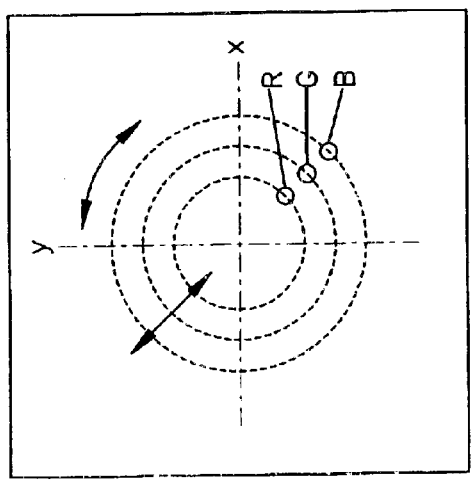
FIG. 11 is a schematic diagram for illustrating some of the functions of the system of FIG. 10.

Referring now to FIGS. 10 and 11, the amount of dispersion can be varied to change the amount of separation between spectral images. The angle of deviation also can be varied to change the displacement of a central wavelength from an origin or nondeviated position on the image plane. The dispersion and the wavelength deviation of each optical device is additive, such that the dispersion and deviation of the scanning system is equal to the sum of the dispersion and deviation of each optical device. Rotation of all the optical devices together will rotate the dispersion pattern about the origin of the image plane, e.g., the dispersion pattern will orbit the origin along the indicated circular paths. Counter-rotating one pair of optical devices relative to the other optical devices varies the dispersion (the spacing between spectral images and the distance between orbits). The scanning system also provides a new way of perturbing an imaging system that may yield advantages for phase diversity analysis, e.g. the orientation of the dispersed spectral images relative to one another also can be varied. The scanning system also can scan in achromatic or chromatic modes. The chromatic field of regard generally is greater than the achromatic field of regard.

Although the invention has been shown and described with respect to certain illustrated embodiments, equivalent alterations and modifications will occur to others skilled in the art upon reading and understanding the specification and the annexed drawings. In particular regard to the various functions performed by the above described integers (components, assemblies, devices, configurations, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the herein illustrated embodiments of the invention. In addition, while a particular feature of the invention may have been described above with respect to only one of several illustrated embodiments, such a feature may be combined with one or more other features of the other embodiment, as maybe desired and advantageous for any given or particular application.

What is claimed is:

1. An optical system capable of variably dispersing incident electromagnetic energy, comprising at least two optical elements spaced apart a fixed distance, whereby rotation of one or more of the optical elements relative to one or more of the other optical elements changes the degree of dispersion, and rotation of all of the optical elements together in a common direction changes the orientation of the dispersion, a detector at a fixed distance from the optical elements to receive electromagnetic energy from the optical elements and convert it into electronic data, a controller that controls the rotation of the optical elements to selectively vary the dispersion of the electromagnetic energy and the orientation of the dispersion produced by the optical elements on the detector and a processor that analyzes the electronic data to identify spectral signatures of objects in the system's field of view.

2. A system as set forth in claim 1, wherein the optical elements are selected to have approximately zero-degree deviation of a central wavelength and nonzero-degree deviation of at least one other wavelength.

3. A system as set forth in claim 1, wherein the optical elements are selected to have nonzero-degree deviation of a central wavelength.

4. A system as set forth in claim 1, wherein the optical elements include one or more of a diffractive device, a refractive device or both.

5. A system as set forth in claim 1, wherein the optical elements include at least one diffraction grating.

6. A system as set forth in claim 1, wherein the optical elements include at least one prism.

7. A system as set forth in claim 1, wherein the optical elements are grouped into sets, each set having at least two optical elements that maintain a constant orientation relative to the other optical elements of the set.

8. A system as set forth in claim 1, wherein the at least two optical elements include a first set of optical elements and a second set of optical elements.

9. A system as set forth in claim 8, wherein the first set of optical elements includes a first prism formed of a first material and having a first apex angle, and a second prism formed of a second material and having a second apex angle; the second set of optical elements includes a third prism formed of a third material and having a third apex angle, and a fourth prism formed of a fourth material and having a fourth apex angle; and each prism is selected so that a desired central wavelength has an approximately zero-degree deviation upon passing through the respective set of optical elements.

10. A system as set forth in claim 9, wherein the first prism is the same as the third prism, and the second prism is the same as the fourth prism.

11. A system as set forth in claim 9, wherein each set of optical elements includes at least two prisms secured together and aligned so that the central wavelength of electromagnetic energy incident on the set of optical elements generally passes through both prisms.

12. A system as set forth in claim 1, further comprising an imaging assembly at a fixed distance from the optical elements that receives dispersed electromagnetic energy from the optical elements and focuses the electromagnetic energy toward an image plane.

13. A system as set forth in claim 12, wherein the imaging assembly includes a lens doublet.

14. A system as set forth in claim 12, wherein the detector is at an image plane that is a fixed distance from the optical elements to receive at least a portion of the electromagnetic energy from the imaging assembly and to convert the incident electromagnetic energy into electronic data.

15. A system as set forth in claim 1, wherein the detector includes at least one photodetector pixel.

16. A system as set forth in claim 14, wherein the detector includes an array of photodetector pixels.

17. A system as set forth in claim 1, further comprising a memory for storing the electronic data.

18. A system as set forth in claim 17, wherein the memory includes a library of electronic data representative of spectral signatures of known objects to facilitate identification of objects in a field of view.

19. A system as set forth in claim 1, further comprising a motor connected to each optical element to rotate each optical element independently.

20. A system as set forth in claim 1, further comprising a motor connected to each of at least two sets of optical elements, each set having at least two optical elements, each set of optical elements being rotatable independently of the other set.

21. A system as set forth in claim 19, wherein the motor connected to each set of optical elements includes a first motor connected to a first set of optical elements and a second motor connected to a second set of optical elements.

22. A system as set forth in claim 19, wherein the controller selectively and independently controls each motor.

23. A missile having an optical system as set forth in claim 1.

24. A system as set forth in claim 1, wherein the at least two optical elements includes four optical elements, each optical element being independently rotatable.

25. A system as set forth in claim 24, wherein selectively rotating the optical elements changes the look-angle of the incident electromagnetic energy entering the system.

* * * * *

UNITED STATES PATENT AND TRADEMARK OFFICE
CERTIFICATE OF CORRECTION

PATENT NO. : 6,747,738 B2
DATED : June 8, 2004
INVENTOR(S) : David J. Knapp

It is certified that error appears in the above-identified patent and that said Letters Patent is hereby corrected as shown below:

<u>Column 1,</u>
Line 3, please insert -- This invention was made with Government support under Contract No. N00024-98-C-5362 awarded by the Department of the Navy. The Government has certain rights in this invention. --.

Signed and Sealed this

First Day of February, 2005

JON W. DUDAS
*Director of the United States Patent and Trademark Office*